No. 757,737. PATENTED APR. 19, 1904.
W. M. GREEN & J. R. GENT.
SLIDE FEEDING DEVICE FOR PICTURE PROJECTING APPARATUS.
APPLICATION FILED JULY 30, 1903.
NO MODEL. 7 SHEETS—SHEET 4.

No. 757,737. PATENTED APR. 19, 1904.
W. M. GREEN & J. R. GENT.
SLIDE FEEDING DEVICE FOR PICTURE PROJECTING APPARATUS.
APPLICATION FILED JULY 30, 1903.
NO MODEL. 7 SHEETS—SHEET 6.

No. 757,737. Patented April 19, 1904.

UNITED STATES PATENT OFFICE.

WILLIAM M. GREEN, OF EVANSTON, AND JOHN R. GENT, OF CHICAGO, ILLINOIS.

SLIDE-FEEDING DEVICE FOR PICTURE-PROJECTING APPARATUS.

SPECIFICATION forming part of Letters Patent No 757,737, dated April 19, 1904.

Application filed July 30, 1903. Serial No. 167,522. (No model.)

*To all whom it may concern:*

Be it known that we, WILLIAM M. GREEN, of Evanston, and JOHN R. GENT, of Chicago, in the county of Cook and State of Illinois, have invented certain new and useful Improvements in Slide-Feeding Devices for Picture-Projecting Apparatus; and we do hereby declare that the following is a full, clear, and exact description thereof, reference being had to the accompanying drawings, and to the letters of reference marked thereon, which form a part of this specification.

This invention relates to an improved slide-feeding device for picture-projecting apparatus.

A device embodying our invention is of that class in which a plurality of slides are held face to face in the apparatus and said slides are shifted one by one into line with the optical axis of the projecting apparatus and in which the action of the device is automatic or is continuous or, in other words, in which the apparatus acts to automatically feed the series of slides successively and continuously into position for projection.

The invention consists in the matters hereinafter described, and pointed out in the appended claims.

In the accompanying drawings, illustrating our invention, Fig. 5$^a$ is a detail section on line 5$^a$ 5$^a$ of Fig. 5. Fig. 5$^b$ is a detail section on line 5$^b$ 5$^b$ of Fig. 5.

As shown in the said drawings, A designates the lantern or housing which contains the lamp or burner which supplies light for the projecting apparatus; B, the tubular casing containing the condensing-lenses; C, the tube containing the projecting-lenses, and D a light-excluding casing or housing of tubular form, which is connected with the movable outer section of the lens-tube C by means of a bellows-section D'. The parts described constitute a picture-projecting apparatus of familiar form and constitute no part of the present invention.

The frame of the slide holding and feeding device consists principally of a front plate E and a rear plate F, which are attached to and connected by a base board or plate. Said plates E and F are arranged vertically and parallel with each other and at right angles to the optical axis of the said projecting apparatus. The said front plate E projects across or in front of the condensing-lens tube B between the same and the objective-lens tube C, as clearly seen in Fig. 1, and said plate has an opening or aperture $e$, the center of which is in the optical axis of the projecting apparatus. Said front plate is also provided with openings or apertures $e'$ $e^2$ of suitable size for the passage of the slides, as clearly seen in Fig. 5. On the front or outer face of the said plate E is mounted a rotative slide-carrier, preferably having the form of a circular plate or disk. Said slide-carrier is secured to the front end of a horizontal shaft G', which passes through and has bearing in the said plates E and F. The said slide-carrier G is provided with four equally-spaced and symmetrically-arranged openings or apertures $g\ g$, each of proper size and shape to receive one of the slides, which latter are indicated by $S^a$. Said apertures $g\ g$ constitute holders for the slides in which the said slides are separately held and in which through the rotative motion of the slide-carrier the slides are carried one by one into and out of position for projection.

Figure 1:
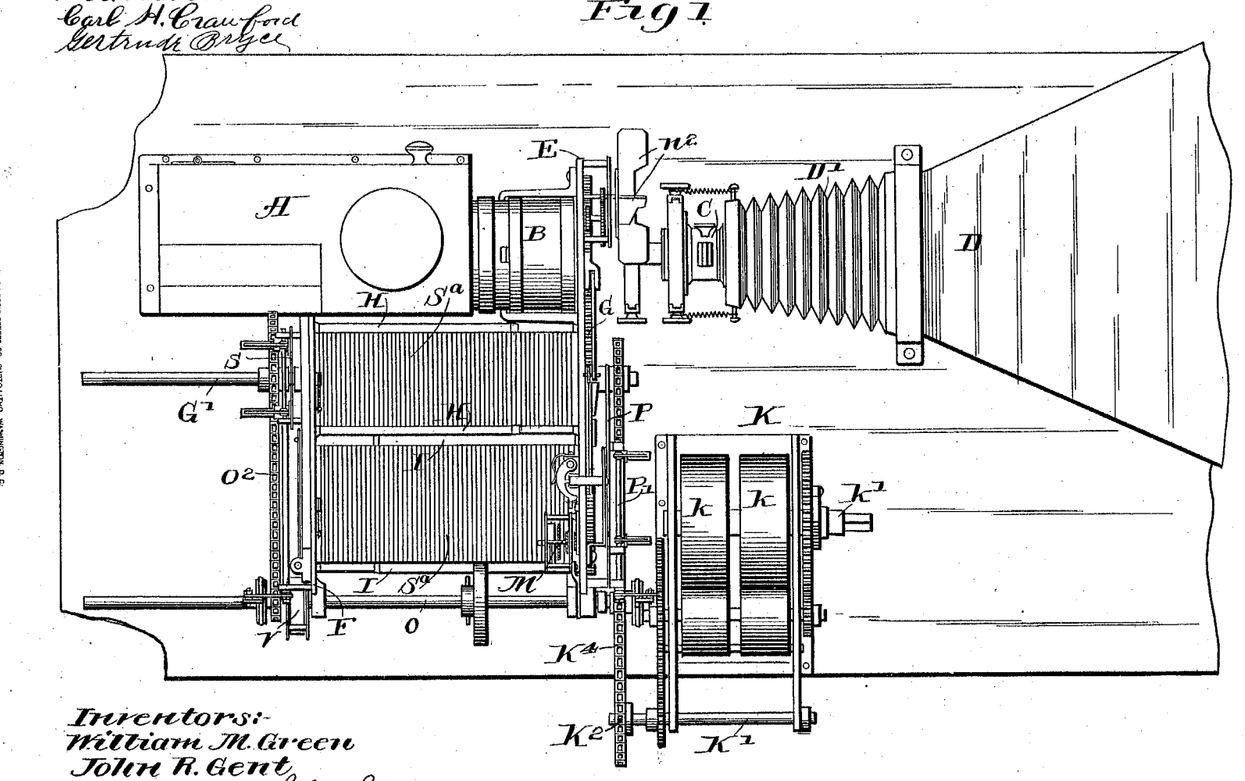
Figure 1 is a plan view of an apparatus embodying the same, including a lantern and other parts of the projecting apparatus.
Figure 4:
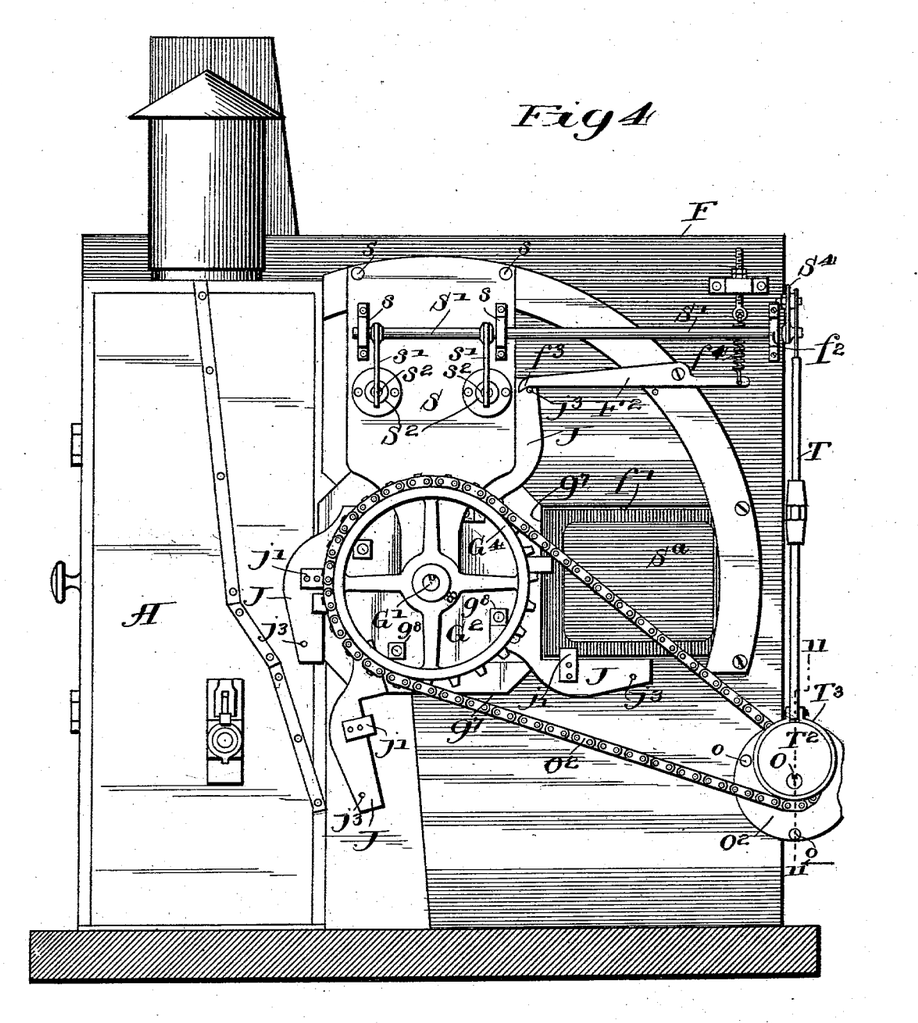
Fig. 4 is a rear elevation of the same parts, together with the lantern.

The three apertures $e$, $e'$, and $e^2$ of the front plate E are disposed in the same relation to each other as three of the apertures $g\ g$ in the slide-carrier G, so that the apertures in the front plate will coincide with the three uppermost apertures in the slide-carrier in any one of four positions of said carrier. The rear plate F, as clearly seen in Figs. 1 and 4, is narrower than the front plate E, being reduced in width at one side thereof to give room for the lantern A, and said rear plate is provided with two openings or apertures for the passage of the slides $S^a$, which are arranged the uppermost one $f$ in alinement with the uppermost aperture $e'$ of the front plate E, and the lowermost one $f'$ in alinement with the aperture $e^2$ of the said front plate. Between the front and rear plates E and F and adjacent to the bottom and side margins of the apertures $e'$ and $f$ extend parallel supporting-rods H H, and like supporting-rods I I extend between said plates adjacent to the sides and bottoms of the apertures $e^2$ and $f'$. The two groups of rods H H and I I constitute holders for the several slides in which the same rest or are supported in face-to-face relation. The uppermost holder formed by the rods H H, which is located above the shaft G', constitutes the delivery-holder or that from which the slides are delivered to the carrier G preparatory to being carried by said carrier into position for projection. The lowermost or lateral holder formed by the rods I I constitutes the receiving-holder to which the slides are delivered from the carrier G after the same have been carried by said carrier into and past the position for projection.

A rotative slide-carrying mechanism is located at the rear of said rear frame-plate F for carrying or shifting the slides from the receiving to the delivery holder. This latter device embraces a disk $G^2$, which is attached to and turns with the shaft G', and four arms J J J J, which are pivoted to said disk $G^2$ and which act upon the slides to carry or move the same edgewise from the rear end of the receiving-holder to the rear end of the delivery-holder. The said disk $G^2$ and its arms J J, being attached to and turning with the shaft G', rotate in the same direction as the slide-carrying disk G and have a corresponding intermittent rotative movement.

The carrier G is turned in a direction to carry the slides from the upper or delivery holder toward the position for projection, while the carrier formed by the disk $G^2$ and arms J J is turned in a direction to carry the slides from the receiving to the delivery holder. The center lines of the slide-holders and the optical axis of the projecting device (coinciding with the center of the aperture $e$ in the front plate E) are located at equal distances from the axis of rotation of the front and rear slide-carriers, so that a slide received by the carrier G from the delivery-holder will be carried by the latter into position for projection, while at the same time another slide will be carried by said carrier G into position opposite the front end of the receiving-holder, and a slide received from the rear end of the receiving-holder will be carried by said disk $G^2$ and one of its arms J into a position opposite the rear end of the delivery-holder.

Devices are provided for turning said carriers adapted to give intermittent rotative movement thereto and to turn the same a quarter of a complete rotation at each movement, the two holders and the optical axis of the projecting apparatus being located with respect to the axis of rotation of the carriers at angles of ninety degrees to each other, so that a slide delivered to one of the openings $g$ in the carrier G from the upper or delivery holder is carried by said carrier first into position for projection, then to a position vertically below the delivery-holder, and then into a position opposite the receiving-holder, to which the slides are delivered from the carrier. In connection with said rotating carriers and means for rotating the same devices are provided for thrusting or forcing the slides from the said carriers into the holders, these devices being located at a point in front and rear of the carriers and acting on the slides to thrust them toward the slides already in the holders and to move all of those previously inserted into the holders endwise of the same, these devices being adapted to move the slides forward step by step a distance equal to the thickness of the slides at each step, so as to deliver the said slides one by one from said holders to the carriers.

Figure 13:
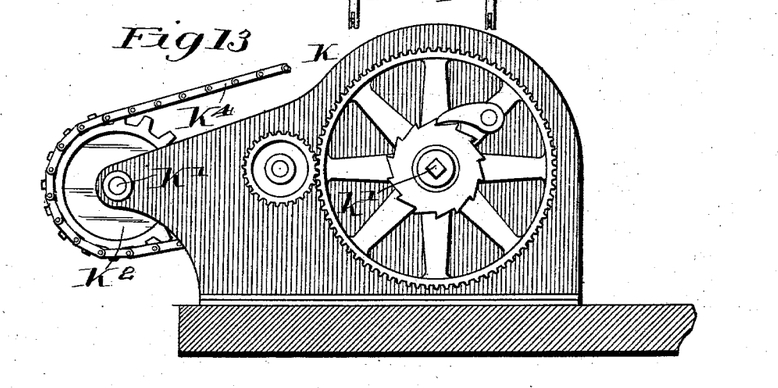
Fig. 13 is a detail front view of the motor-casing and associated parts.

The rotative carriers at the front and rear of the apparatus are operated through the medium of the shaft G', which is driven in the construction shown by means of the spring-motor. (Indicated as a whole by K and shown in Figs. 1, 2, and 13.) Said spring-motor, as shown, is of familiar form, having coiled springs $k\ k$, mounted on a winding-shaft $k'$, and provided with a shaft K', which is driven by suitable gearing from the coiled spring and is provided with a sprocket-wheel $K^2$, from which motion is transmitted, by means of a chain belt $K^4$, to a sprocket-wheel $G^3$ on the forward end of the shaft G'.

Provision is made for giving the necessary rotative intermittent movement to the shaft G' or, in other words, for automatically controlling the rotation of the rotative slide-carriers and shaft G' so that the movement of the carrier G shall be arrested when a slide has reached the position for projection, will be held stationary for the exposure of the picture a desired length of time, and again permitted to move a quarter-rotation to bring another slide into position for projection. Such devices, as herein shown, are associated with said carrier G and are constructed as follows: On the outer faces of said carrier G are secured four stops $g'$ $g'$, adapted for contact with a pivoted detent L, which latter is mounted on the front face of the plate E, near the upper edge thereof, as clearly seen in Fig. 3. The stop projections $g'$ $g'$ and the detent-lever L are so arranged that when either one of the stops is in contact with the detent the carrier will be held in position with the slide-carrying apertures $g$ opposite the receiving and delivery holders and in line with the optical axis of the projecting device.

Provision is made for shifting or moving automatically the detent L so as to bring the free or movable end of the same out of line with the stop-lugs $g'$ $g'$, consisting of devices made as follows: L' is a horizontally-arranged pivoted lever mounted on the front face of the plate E with its free end overlapping the margin of the carrier G and in position for contact with a series of four stop-pins $g^2$ $g^2$ on said carrier, said pins being so arranged that when they come in contact with the free end of the lever L' they will lift the same. A trip-lever $L^2$ is also mounted on the upper part of the plate E, said lever having a forked end which engages a pin $l'$ in an upwardly-extending arm $l$ on the lever L. The downward movement of the lever $L^2$ is limited by means of the stop-pin $l^8$. $L^3$ designates a weighted slide-bar, which is mounted to slide vertically in guide-brackets $l^3$ $l^4$, attached to the rear face of the plate E, and the upper end of which projects forwardly over the top of the said plate and over the end of the trip-lever $L^2$ opposite that engaged by the detent L. The said forwardly-projecting upper end of the bar $L^3$ is connected with the lever L' by means of a link $l^2$. The pins $g^2$ acting on the lever L' serve to lift the weighted slide-bar $L^3$ preparatory to the action thereof upon the lever $L^2$. When so lifted, however, the said slide-bar $L^3$ is supported in its elevated position by means of a detent-lever $L^4$. (Shown in Figs. 5, 6, and 7.) Said detent-lever $L^4$ is pivoted to the upper surface of the upper guide-bracket $l^3$, Figs. 5 and 6, so as to swing horizontally above the said upper guide-bracket, and has between its ends a holding-tooth $l^5$, which is adapted to engage a downwardly-facing shoulder on the slide-bar $L^3$, herein shown as formed at the upper end of a groove $l^6$ in the face of said bar. The detent-lever $L^4$ is thrown or held toward the slide-bar by means of a spring $l^7$, and the parts are so arranged that when the said slide-bar is lifted by the action of one of the pins $g^2$ on the lever L' the tooth $l^5$ engages the upper end of the slot $l^6$ as soon as the said bar is lifted to the upper limit of its movement, and thereby holds said rod in its elevated position after the pin $g^2$ has moved past the end of the lever L'. Said pins $g^2$ are located in advance of the stop-lugs $g'$ on the carrier G, so that the said pins serve to actuate the lever L' and lift the slide-rod $L^3$ to its elevated position, thereby permitting the detent-lever L to descend by gravity into position for contact with the said stop-lugs before the latter reach the detent-lever. It follows that when either stop-lug reaches said lever and strikes the same the disk will be thereby held from further rotation and will remain immovable in position with one of the slides in position for projecting so long as the said slide-bar $L^3$ retains its elevated position. When, however, the detent-lever $L^4$ is moved so as to disengage it from said slide-bar, the latter will descend and by striking a hammer-like blow upon the end of the lever $L^2$ beneath it will depress the said end of the lever $L^2$, and thereby lift the opposite end of the said lever and the detent-lever L, and thereby release the slide-carrier and permit it to turn a quarter-rotation under the action of the spring-motor which actuates it. At the end of such quarter-rotation the next succeeding stop-lug $g'$ will strike the detent-lever L, and the carrier will be thereby held from movement until again released by the dropping of the slide-bar in the manner described.

It is obvious that the time of exposure will be determined by the interval of time between the arrest of the carrier G through the action of the detent L and the time of the release of the same through the dropping of the slide-bar $L^3$, and a device embracing a clockwork or timing mechanism is provided for operating the detent-lever $L^4$ to release the slide-bar, and thus effect the release of the slide-carrier at a desired period of time after the same has been stopped by the action of the detent-lever.

As shown in the accompanying drawings, M indicates as a whole a spring-actuated timing mechanism embracing the usual coiled actuating-spring $m$ and a train of gears which drives a slowly-turning shaft or arbor $m'$. This arbor has attached to its forward end adjacent to the inner face of the plate E a disk $m^2$. To the face of this disk are pivoted two weighted arms M' by means of pivot-pins $m^3$, located a short distance from the shaft $m'$. The inner ends of said arms M' extend past the said pivot-pins $m^3$, and are adapted to come in contact with the said shaft $m'$, so that the weighted arm, which is at the rising side of the disk, will be supported in an extended position as it rises, as clearly seen in Fig. 7. By reason of the arrangement of these parts described, moreover, when either one of the pivot-pins $m^3$ passes a point above the shaft $m'$ in the rotation of the disk the weighted arm M', pivoted thereto, will fall forwardly and downwardly until it hangs in a vertical position from the said pivot-pin. The outer ends of said weight-arms M' are, moreover, provided with beveled surfaces $m^4$, and the said ends of the arms are adapted to pass between the rear face of the plate E and the free end of the detent-lever $L^4$ in such manner that the said beveled surface $m^4$ will act on the said lever to force the same outwardly or rearwardly and release the slide-bar $L^3$. The shaft $m'$ and disk $m^2$ are turned so slowly that the pivot of each weighted arm will be carried over the shaft and the arm will fall forward into contact with and actuate the lever $L^4$ at the intervals of time required for desired exposure of the slides or pictures.

It will of course be understood that the arms M' would operate in the same manner to release the slide-bar $L^3$ at desired intervals if said arms were rigidly attached to the shaft $m'$, inasmuch as the time of release through the action of the arms depends upon the rate of speed of rotation of the said shaft $m'$, the weighted arms, pivoted to the shaft so as to drop, as described, being employed to afford a prompt or quick releasing movement in the detent-lever $L^4$.

For the purpose of controlling the speed of rotation of the slide-carrier G and connected parts a device is provided as follows: Said carrier G has the form of a circular disk provided with peripheral gear-teeth $g^3$, which intermesh with a gear-pinion $n$ on a shaft N, which is mounted at one end in the plate E and at the other end in a supporting-plate $n'$, attached to the outer surface of said plate E. On a shaft N', which also has bearings in the plate E and plate $n'$, is mounted a disk $N^2$, carrying a series of fan-blades $n^2$. Gear-wheels $n^3$ $n^4$ on the shafts N N' serve to transmit motion from the gear-wheel $n$ to the shaft N'. These gear-wheels are arranged to give a high rate of speed in the fan-blades, so that the latter, through the resistance of air on said blades, limit the speed of rotation of the said carrier, it being of course understood that the purpose of limiting the speed of said carrier is to prevent the same acquiring so high a degree of velocity as to produce objectionable impact or jar when its motion is arrested by contact of the stop-lugs $g'$ with the detent L. By reason of the fact that the fan-disk $N^2$ and the fan-blades thereon will be revolving at a high rate of speed when the movement of the carrier is arrested a yielding connection is provided between the fan-blades and the shaft N', on which the same are mounted. Such yielding connection is made by mounting the disk $N^2$ to turn on the shaft N' and by attaching to the shaft a ratchet-wheel $n^6$, which is engaged by a spring-actuated pawl $n^7$ on the disk $N^2$. This construction permits the fans to revolve freely on the shaft in the direction in which said fan-blades rotate, while insuring that the fan-blades shall rotate with the shaft when the latter is turned by the action of the carrier G and intermediate gearing, as described.

Now referring to the devices for shifting or moving the slides from the carrier G to the receiving-holder and moving the said slides through the said holder and also for shifting or delivering the slides from engagement with the disk $G^2$ and carrying-arms J J at the rear of the plate F to the delivery-holder and moving them through the latter holder, these parts are constructed as follows: The devices for so shifting or moving the slides are operated from a single shaft O, which has bearings in the plates E and F and is arranged parallel with the shaft G', said shaft O being preferably located at the side edges of said plates and near the bottom edges thereof. Said shaft O has an intermittent rotative movement and is driven from the shaft G' by means of a sprocket-wheel $G^4$, which is secured to said shaft G' at the rear of the plate F, a sprocket-wheel O', mounted on the shaft O, and a chain belt $O^2$, which is trained over the sprocket-wheels $G^4$ and O'.

The devices at the forward end of the machine for thrusting or forcing the slides from the slide-carrier G into the receiving-holder are constructed as follows: P, Figs. 1, 2, 3, 10, and 14, is a supporting-plate arranged outside of and parallel with the carrier G. Said plate is supported at its outer end from the frame-plate E by the means of two posts or studs $p$ $p$, Fig. 2, and at its inner end is supported or held in place by engagement with the shaft G', the said plate being provided with an aperture through which the shaft passes and being confined between a hub $g^5$ at the center of the carrier G and the hub of the sprocket-wheel $G^3$, as clearly seen in Fig. 14. Mounted on the outer face of the plate E is a horizontally-arranged rock-shaft P'. Said rock-shaft has depending parallel arms $p'$, which are connected at their lower ends with pistons or sliding rods $p^2$, which pass through and are guided in guide-sleeves $P^2$, secured to the outer face of the plate P. To the inner ends of the plungers $p^2$ are secured presser-plates $P^3$, Figs. 5, 10, and 14, which act directly upon the slides in the endwise inward movement of the plungers $p^2$. At its outer end the rock-shaft P' is provided with an outwardly-extending rigid arm $P^4$, Fig. 2. In said arm is secured a wrist-pin $p^4$, Fig. 3. The said arm is longitudinally slotted, and the wrist-pin is made endwise adjustable therein, as clearly seen in Figs. 2 and 3, the adjustable connection of the wrist-pin with the arm being for the purpose of enabling the stroke or movement of the plungers to be varied or adjusted as desired. Connected with the said arm $P^4$ is a pitman or connecting-rod Q, Fig. 2, the upper end of which is engaged with the wrist-pin $p^4$ and the lower end of which is connected with the strap Q' of an eccentric Q², which is secured to the shaft O. These parts are so constructed that at each complete revolution or rotation of the shaft O and eccentric Q² the rock-shaft P' will be turned and the plungers $p^2 p^2$ will be thrust inwardly with the presser-plate P³ P³, the movement given to the said plunger and presser-plate being sufficient to carry a slide from its position in the aperture $g$ of the carrier G inwardly through the plate E until it rests upon the rods I I, constituting the receiving-holder.

When the slides are received in the apertures $g$ $g$ of the slide-carrier G from the delivering-holder, they are held within the said apertures by means of a plurality of clips or plates $g^4$, which are secured to the outer face of the carrier and project inwardly over said apertures, the said clips thus arranged serving to limit the outward movement of the slides when they are thrust into said apertures from the delivery-holder and to confine said plates from outward movement or from falling out of the apertures during the rotation of the carrier. It will of course be understood that the slides are held from inward movement during rotation of the carrier by contact with the outer surface of the frame-plate E, against the face of which the carrier G rotates. When, however, either aperture $g$ of the carrier is in position for the delivery of a slide therefrom to the receiving-holder, the said aperture $g$ in the carrier will be opposite the opening $e^2$ of the plate E, and being of the same size as said opening $e^2$ the slide will be free to move inwardly through the opening $e^2$, as clearly seen in Figs. 10 and 14. It follows that when any one of the apertures $g$, with its contained plate, is opposite the opening $e^2$ a single rotation of the shaft O will result in the turning of the rock-shaft P' and inward movement of the arms $p'$ thereon, together with an inward movement of the presser-plates P³, which by their pressure on the outer face of the slide in the said aperture $g$ will thrust it inwardly through the opening $e^2$ upon the supporting-rods I I of the receiving-holder.

Figures 5, 6, 7:
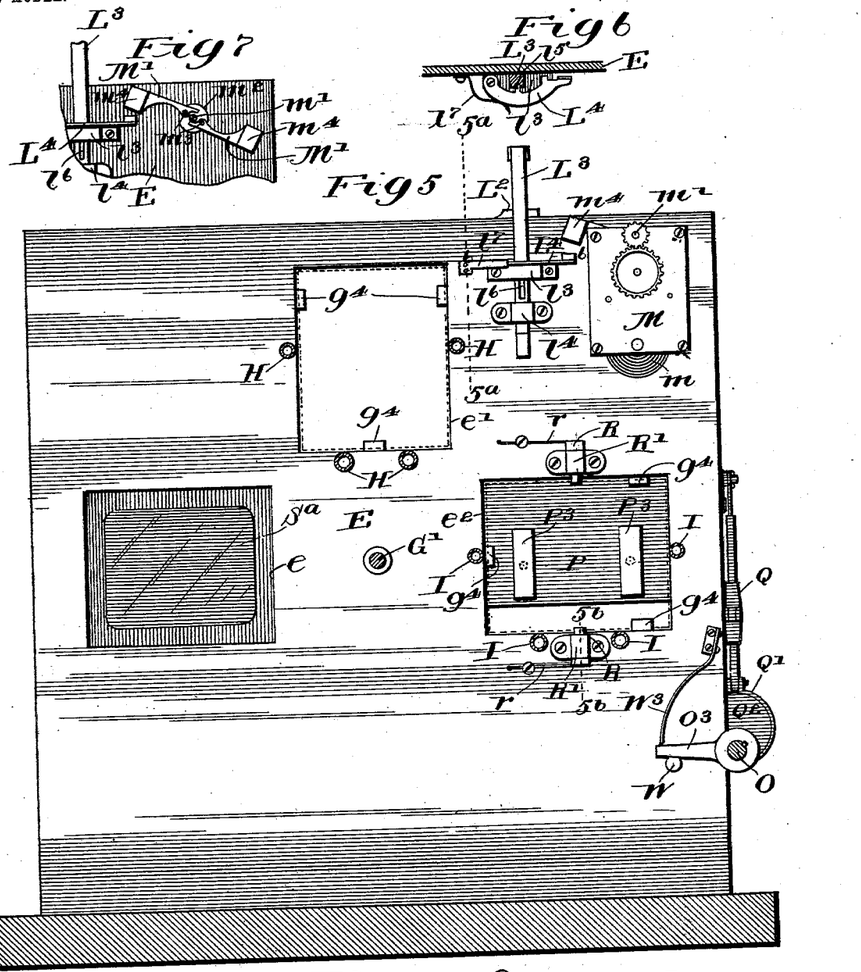
Fig. 5 is a sectional view of the apparatus, taken on a plane adjacent to the front plate thereof indicated by the line 5 5 of Fig. 2.
Fig. 6 is a detail plan section taken through the front plate of the apparatus on line 6 6 of Fig. 5.
Fig. 7 is a detail face view of the parts shown at the upper right-hand corner of Fig. 5 with the main parts of the spring-motor which operate the actuating-arms of the timing mechanism removed, so as to show said arms in full.
Figure 5A:
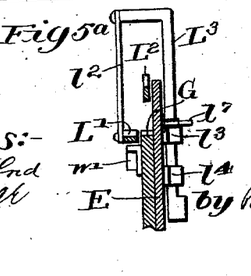
Figure 5B:
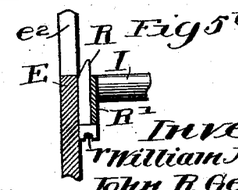
Figures 10, 11, 12, 14:
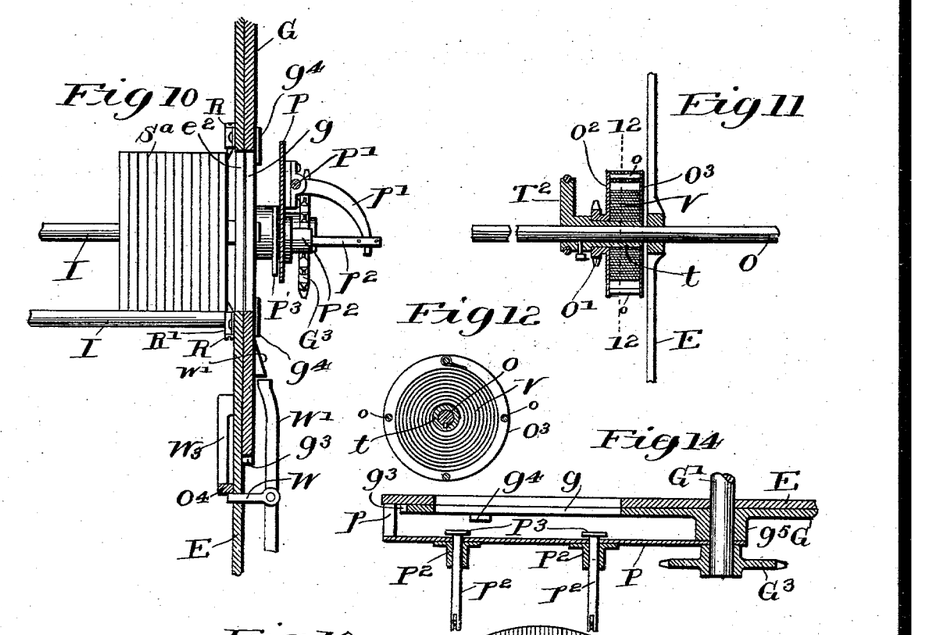
Fig. 10 is a detail vertical section through the front plate of the machine and adjacent parts on line 10 10 of Fig. 3.
Fig. 11 is a detail section taken on line 11 11 of Fig. 4.
Fig. 12 is a cross-section taken on line 12 12 of Fig. 11.
Fig. 14 is a detail section taken on line 14 14 of Fig. 3.

In order to insure that the plates thus thrust inwardly through the opening $e^2$ shall be held in a vertical position and in contact with those already within the said holder and shall not fall outwardly, so as to interfere with the subsequent free rotation of the slide-carrier, holding devices are provided, consisting of spring-pressed detents R, Figs. 10 and 5ᵇ. Said detents R each consist of a sliding bolt mounted in a guide-bracket R' in position to project over the opening $e^2$ and which is held in its forward position by means of a spring $r$, herein shown, Fig. 5, as having the form of wire spring secured to the rear face of the plate E and pressing on the inner end of said bolt. The inner ends of the bolts R are beveled so that they will be pressed or forced outwardly when the edges of the slides come in contact therewith, and thus permit the slides to pass the same. The bolts spring forward behind the outer faces of the slides as soon as the slides have been thrust inwardly past the detents. The position of the slides, with the detents R engaging the outermost or last-inserted slide, is clearly shown in Fig. 10.

Figure 2:
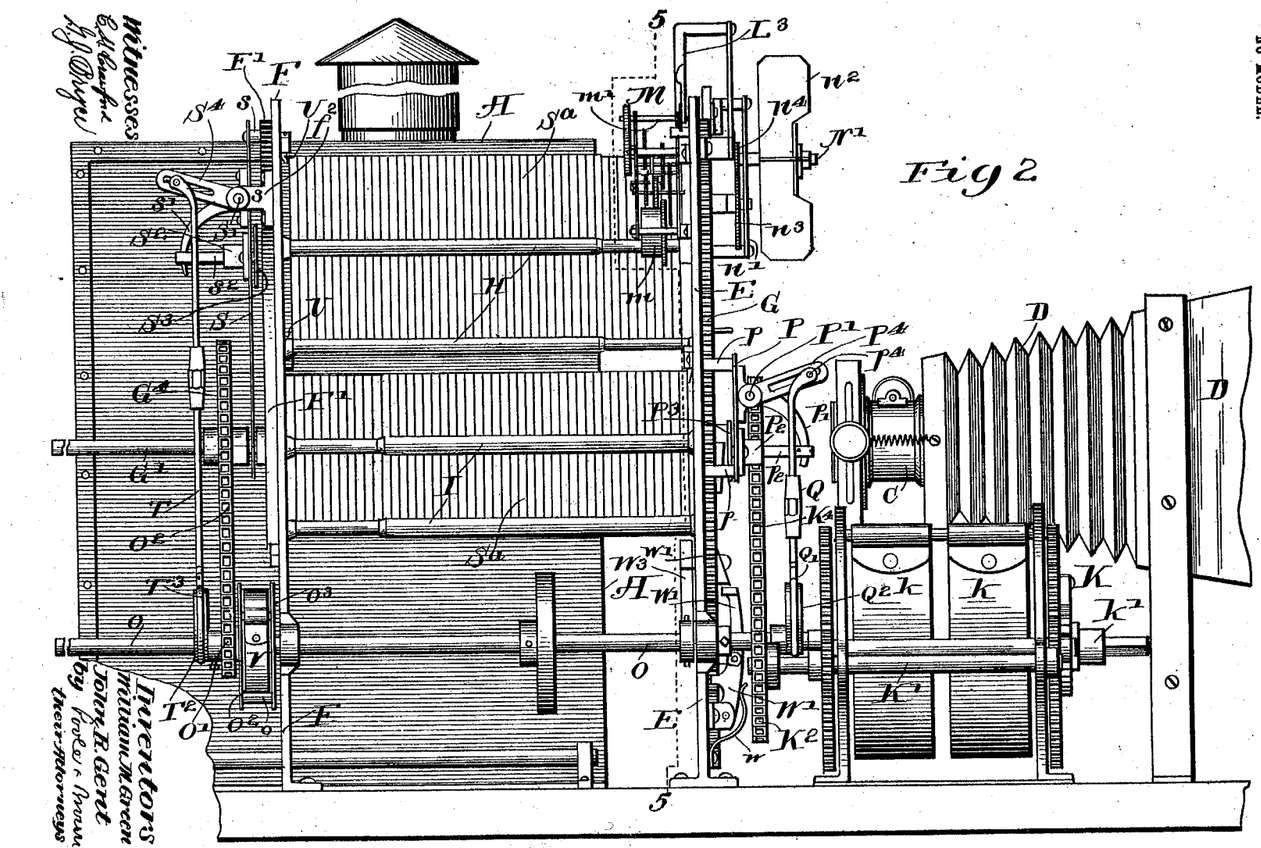
Fig. 2 is a side elevation of the same parts on a somewhat-enlarged scale.
Figure 3:
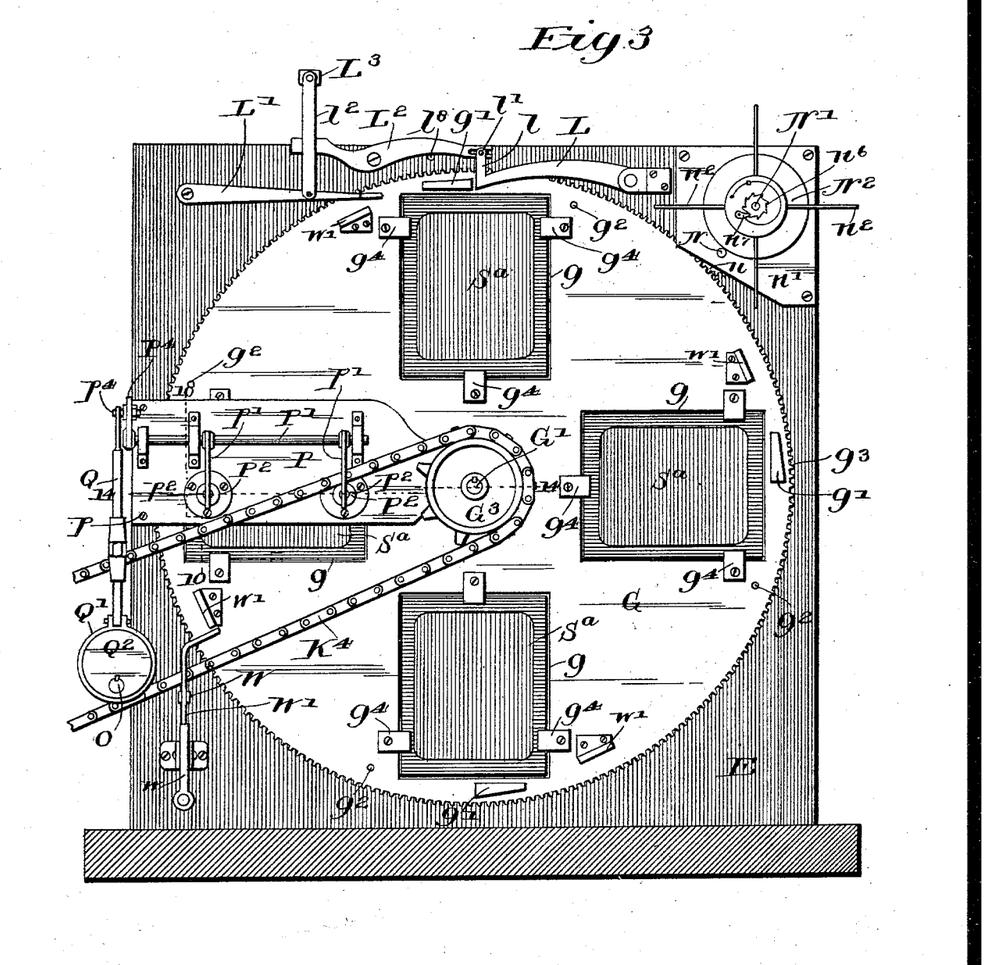
Fig. 3 is a front elevation of parts of the device directly concerned in moving or shifting the slides.

Now referring to the parts at the rear of the machine for introducing the plates into the receiving-holder, these parts are substantially like those on the front plate E and are made as follows: S, Figs. 2 and 4, is a plate corresponding with the plate P and supported at its upper margin by studs $s$ $s$ from the plate F and engaged at its lower end with the shaft G'. S' is a rock-shaft which is mounted in bearings $s$ $s$ on the plate S and which also has a bearing $f^2$ located adjacent to the side margin of the frame-plate F. The rock-shaft S' carries depending rocker-arms $s'$, which act on plungers $s^2$, which have sliding engagement with guide-sleeves S³, attached to the plate S. At their inner ends the said plungers $s^2$ carry presser-plates S³, as clearly seen in Fig. 2. The said rock-shaft S' is provided at its outer end with a rigid arm S⁴, with which is connected a connecting-rod T, the lower end of which is pivoted to the strap T³ of an eccentric T² on the shaft O. On the inner face of the said plate F, adjacent to the aperture $f$ therein through which the slides are inserted, are located spring-detents U U, which are constructed and operate in the same manner as the detents R R on the front plate E, before described. The two eccentrics Q² and T² on the shaft O are mounted in the same angular position on the shaft, so that a single rotation of said shaft gives corresponding movement to the rock-shafts P' and S' and the pressers carried thereby. It follows that each time the shaft O makes a complete rotation a slide will be thrust from its place in the slide-carrier G into the receiving-holder, while another slide will be delivered from the arms J into the delivery-holder. While the shaft O is driven from the shaft G', as above stated, yet said shaft O does not turn with said shaft G', but is turned at times when the slide-carrier G and disk G² are stationary or during the intervals between the turning movements of the shaft G', a connection being provided between the sprocket-wheel O', which is driven from the shaft G', and the shaft O, embracing a spring U, which is placed under tension through the turning of the sprocket-wheel O' on said shaft and which acts to turn the shaft O after each partial rotation of the shaft G'. Said shaft O is held from rotation and is permitted to turn through the action of the spring V at desired times by devices made as follows: The spring V, as clearly shown in Figs. 11 and 12, is a coiled spring which is attached at its inner end to a sleeve $t$ on the eccentric T², which turns with said shaft, while the outer end of said spring is secured to the outer margin of a disk $O^2$, which is rigidly attached to the sprocket-wheel $O'$, which latter is mounted to turn on said sleeve $t$. A second disk $O^3$, also arranged to turn on the sleeve $t$, is shown as connected with the disk $O^2$ by means of studs $o$, with one of which the outer end of the spring $V$ is connected. It follows from this construction that when the sprocket-wheel $O'$ is turned or rotated by the action of the chain belt $O^2$ and the sprocket-wheel $G^4$ the spring $V$ will be placed under tension, the shaft $O$ at this time being held from rotation. The sprocket-wheel $G^4$ is shown as made much larger in diameter than the sprocket $O'$, so that during the quarter-revolution of the shaft $G'$ said pinion $O'$ will be given somewhat more than a complete turn. For holding the shaft $O$ from rotation during the winding or tightening of the spring $V$ said shaft is provided with a rigid stop-arm $O^4$, Fig. 5, located at the rear of the front frame-plate $E$. Said arm is adapted for contact with a sliding detent $W$, which passes through the plate $E$ to the front face thereof and is there connected with a vertically-arranged actuating-lever $W'$, Fig. 3. Said lever $W'$ is pivoted at its lower end to the plate $E$, Fig. 2, and is provided with a spring $w$, which acts on the lever in a direction to force the upper end thereof toward the said plate $E$ to thereby hold the end of the detent $W$, which extends through said plate, rearwardly or in the path of the arm $O^4$. The upper end of the lever $W'$ rises to a point opposite or in front of the slide-carrier $G$, and said carrier is provided with four cam projections or cam-plates $w'$, adapted for contact with the said upper end of the lever $W'$ and to act upon the same in a direction to throw the lever forwardly or outwardly and to thereby draw the rear end of the detent $W$ forwardly and out of the path of the arm $O^3$. The cam-plates $w'$ and the levers $W'$ are so arranged with respect to each other that the lever will be thrown outwardly by each cam-plate and the detent $W'$ released from the stop-arm $O^3$ at times when the slide-carrier $G$ is stationary or held from rotary movement and the slides carried thereby are in position opposite the openings in the plate $E$. As soon as the arm $O^4$ is released the shaft $O$ will be turned by the action of the spring $V$ and will make one complete rotation, the shaft at the end of such complete rotation being again arrested by the detent $W$, which will have returned to its original position in the path of the said arm $O^3$ during the turning of the shaft. It will of course be understood that the cam-plates $w'$ are arranged to move the detent $W$ and permit the shaft to begin its rotary motion just before the movement of the carrier $G$ is arrested, and the lever $W'$ will have passed from engagement with the cam-plate when the carrier has reached its position of rest, as shown in Fig. 3, so that the said detent $W$ will be released and will have returned to its normal position before the shaft $O$ has completed its rotation. In this connection it will of course be understood that the movement of the presser-plates $P^3$ and $S^3$ under the action of the rock-shafts $P'$ and $S'$ and eccentrics $Q^2$ and $T^2$ will be very slow in the beginning of the movement of the shaft $O$, so that the turning movement of the carrier required for releasing the lever $W'$ from the cam-plate $w'$ engaged therewith, occurring after the beginning of the turning of the shaft $O$, will not interfere with the movement of said carrier $G$ and the arms $J$, as the said carrier and arms will have come to a state of rest before the said pressers $P^3$ and $S^3$ come in contact with the slides.

The shaft $O$ being turned by the action of the spring, as described, the rotative movement thereof will be very rapid, and in order to prevent any rebound of the arm $O^3$ after it strikes and is arrested by the detent $W$ a device is provided for preventing any backward movement of said arm $O^4$. This device consists of a spring detent-arm $W^3$, Fig. 5, which is secured to the rear face of the plate $E$ and is arranged with its free end in position to engage the end of the arm $O^4$ at the side thereof opposite that which comes in contact with the detent $W$. As will be readily understood from the drawings, when the said arm $O^4$ approaches the limit of its rotative movement it will strike and press outwardly the end of the detent-arm, which latter will spring back into place over the arm as soon as the latter strikes the detent $W$, and thus hold the said arm and the shaft $O$ from any backward movement.

Figure 8:
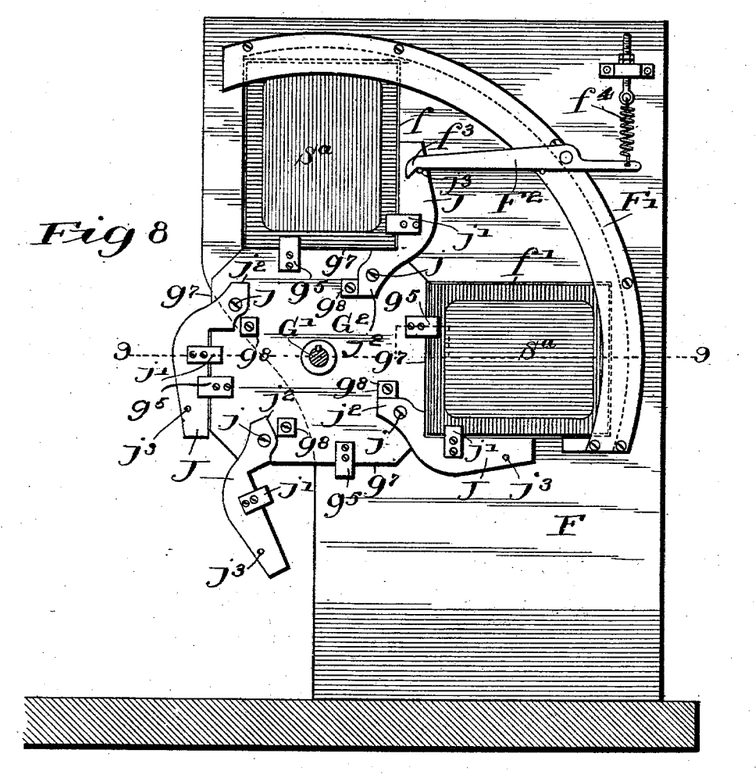
Fig. 8 is a detail face view of the rear plate of the machine with parts thereon mounted.
Figure 9:
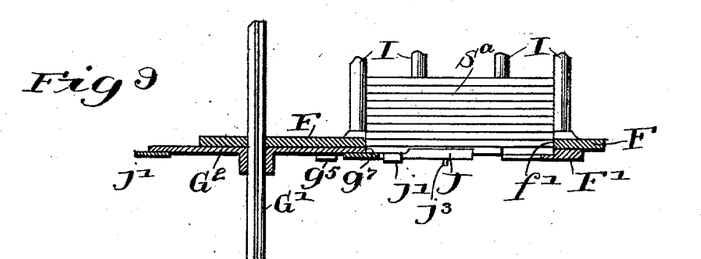
Fig. 9 is a plan section taken upon line 9 9 of Fig. 8.

Now referring to the devices on the rear frame-plate $F$ for shifting or moving the slides from the receiving to the delivery holders and which embraces the disk $G^2$ and arms $J$, above described, these devices are constructed as follows: The disk $G^2$, Figs. 4, 8, and 9, is provided with four straight edges or marginal surfaces $g^7 g^7$, which correspond in position with the inner margins of the two slide-openings $f f'$ in the plate $F$, and the arms $J J$ are pivoted to said plates by means of pivots $j$, which are located in such position that when the arms are extended the advance edge of two of the arms coincide in position, one with the lower margin of said opening $f'$ and the other with the right-hand margin, as seen in Fig. 8, of the opening $f$. The disk $G^2$ is, moreover, provided with clips $g^5$, secured to the rear face thereof and extending past the edges $g^7$ to form stops for the slides when the latter are thrust outwardly from the receiving-holder. The arms $J$ are provided with like plates or clips $j'$, which serve to prevent the margins of the slides being pushed outwardly beyond the edges of the arms $J$ when said slides are thrust from the said receiving-holder. Said arms $J$ are provided at their inner or pivoted ends with extensions $j^2$, adapted for contact with stops $g^8$ on the face of the disk $G^2$. Said stops serve to limit the movement of the arms J in one direction, so that when said arms are at the rising side of the disk $G^2$ the weight of the outer ends thereof will by bringing their arms $j^2$ against the stops $g^8$ hold the arms rigidly in their extended positions. When the arms are thus held rigidly extended at the upwardly-moving side of the disk, they will be in position to engage and move the slides that are delivered thereto through the opening $f'$ from the receiving-holder. By reason of the pivotal connection of the said arms J with the disk $G^2$, however, said arms when they reach the descending side of said disk will swing about their pivots and hang in a vertical position, as shown at the left hand of Fig. 8, and will freely hang by gravity until their arms $j^2$ are again brought into contact with the stops $g^8$, when the arms again approach the bottom of the said opening $f'$.

The end gained by pivoting the arms J in the manner described is to avoid interference of said arms with the lantern A or parts associated with such lantern, such as electric wires or pipes for supplying gas, it being obvious that in the construction described, as clearly shown in Fig. 4, the arms J J when hanging freely at the descending side of the disk $G^2$ project only a short distance from the side margin of the disk.

In connection with the disk $G^2$ and the arms J J thereon a curved stationary guide-strip $F'$ is applied to the rear face of the plate F, said guide-strip being concentric with the shaft $G'$ and arranged to overhang the openings $f\ f'$. Said guide-strip $F'$ is provided in its inner face with a groove or rabbet equal in depth to the thickness of the slides, and said strip serves as a guide for the outer margins of the said slides as the same are moved by the action of the revolving disk $G^2$ and arms J J from the opening $f'$ to the opening $f$.

As clearly seen in the sectional view Fig. 9, the slides held in the receiving-hold and pushed therethrough by the pushing devices at the front end of the apparatus, hereinbefore described, pass one by one through the opening $f'$ in the plate F and into position to rest upon the arm J which is at the time beneath the said opening $f'$, the slides at such time having their inner end margins in contact with the adjacent side edge $g^7$ of the disk $G^2$ and their outer end margins within the grooved guide $F'$. When the disk $G^2$ makes a quarter-rotation, the arm J, then engaged with a slide, carries the same along the outer face of the plate F until the slide is opposite the opening $f$ of the delivery-holder, when the pressers $S^3\ S^3$ operate upon said slide to push the same through the said opening $f$ and into the said delivery-holder.

In order to hold the arms J in an upright position when they reach the opening $f$, thereby avoiding possibility of said arms falling forward and interfering with the action of the pressers, a retaining device is employed consisting of a horizontally-arranged detent-lever $F^2$, Fig. 4, which is pivoted to the plate F and is adapted to swing in a plane just outside of the plane of said arms J. Each of said arms is provided with an outwardly-projecting pin $j^3$, and the lever $F^2$ has a downwardly-inclined prong $f^3$, adapted to engage said pin $j^3$ at the time the arm J is in its upright position. The lever $F^2$ may be held or pressed downwardly against the pin $j^3$ by means of a spring $f^4$, which is herein shown as connected with the plate F and the outer end of the same. The inclined prong or tooth $f^3$ on the detent-lever $F^2$ is so arranged as to release the arms J shortly after they begin their forward movement from their vertical position, so as to permit said arms to fall forwardly, and thus assume a depending position when they reach the downwardly-moving side of the disk $G^2$.

To provide for enlarging or contracting the length of the two slide-holders, the rear plate F is adapted to be moved or shifted on the base-support toward and from the front plate G. The rods I and J, constituting said holders, are made telescopic, and the shafts $G'$ and O are longitudinally grooved, and the sprocket-wheel $G^4$ as well as the sleeve $t$ of the eccentric T are provided with feathers or splines adapted to engage the grooves in the said shafts $G'$ and O.

It is to be understood that the accompanying drawings illustrate one form of device in which the general features of our invention may be embodied in practice and that the details and specific features of construction shown in said drawings and hereinbefore described are merely illustrative and do not constitute essential parts of our invention except so far as the same may be set forth in the appended claims as constituting features thereof.

We claim as our invention—

1. A slide-feeding apparatus comprising a delivery and a receiving slide-holder, and a rotative slide-carrier adapted to receive the slides from the delivery-holder, to carry the same into position for projection and to then carry said slides into position for delivery to the receiving-holder.

2. A slide-feeding apparatus comprising a delivery and a receiving slide-holder, a rotative slide-carrier adapted to receive slides from the delivery-holder, to carry the same into position for projection and to then carry said slides into position for delivery to the receiving-holder and means for shifting the slides from the said slide-carrier into the receiving-holder.

3. A slide-feeding apparatus comprising two slide-holders arranged parallel with each other, rotative slide-carriers for shifting the individual slides from one holder to the other, at both ends of the holders.

4. A slide-feeding apparatus comprising two slide-holders arranged parallel with each other, and rotative slide-carriers for shifting the individual slides from one holder to the other, at both ends of the holders, one of said slide-carriers being adapted to carry the slides into position for projection in their passage from one holder to the other.

5. A slide-feeding apparatus comprising a delivery and a receiving slide-holder, a rotative slide-carrier adapted to receive the slides from the delivery-holder, to carry the same into position for projection, and to then carry said slides into position for delivery to the receiving-holder, means for moving the slides through the delivery-holder toward the slide-carrier, and means for shifting the slides from the slide-carrier into the receiving-holder.

6. The combination with a projecting apparatus, of two parallel slide-holders, rotative slide-carriers located at opposite ends of the holders and adapted to receive the slides from the holders, the slide-holders and the optical axis of the projecting apparatus being located at equal distances from the axis of rotation of the rotative slide-carriers and means acting to thrust the slides from the carriers into the holders.

7. A slide-feeding apparatus comprising two slide-holders, rotative slide-carriers located at opposite ends of the holders and adapted to receive the slides from the holders and means acting to thrust the slides from the slide-carriers into the holders and to move them through the latter.

8. A slide-feeding apparatus comprising two parallel slide-holders, rotative slide-carriers located at opposite ends of the holders, adapted to receive the slides from the holders, and reciprocating pressers acting to shift the slides from the carriers into the holders and to move them through the latter.

9. The combination with a projecting apparatus, of two slide-holders, rotative slide-carriers at both ends of said slide-holders for shifting the individual slides from one holder to the other, said slide-holders and the optical axis of the projecting apparatus being located at equal distances from the axis of rotation of the slide-carriers, one of said slide-carriers being adapted to carry the slides from one holder into position for projection and to then carry said slides into position for delivery to the other holder, and means for shifting the slides from the carriers into the holders and for moving them through the latter.

10. A slide-feeding apparatus comprising two slide-holders, rotative slide-carriers at both ends of said slide-holders for shifting the individual slides from one holder to the other, one of said slide-carriers being adapted to carry the slides from one holder into position for projection and to then carry said slides into position for delivery to the other holder and reciprocating pressers for shifting the slides from the carriers into the holders and for moving the slides through the holders.

11. A slide-feeding apparatus comprising two slide-holders, rotative slide-carriers located at opposite ends of the holders, means acting to move the slides through the holders, and means for giving intermittent rotative movement to the said slide-carriers, one of said slide-carriers being adapted to carry the slides into position for projection, and to hold them there during the intervals between the movement of the slide-carriers.

12. A slide-feeding apparatus comprising two slide-holders, two rigidly-connected rotative slide-carriers located at opposite ends of the holders and adapted to receive the slides from the said holders, and reciprocating pressers acting to thrust the slides from the carriers into the holders and to move them through the latter.

13. A slide-feeding apparatus comprising two slide-holders, two rigidly-connected, rotative slide-carriers located at opposite ends of the holders and adapted to receive the slides from the holders, means acting to thrust the slides from the carriers into the holders and through the latter, and means for giving intermittent rotative movement to the slide-carriers.

14. A slide-feeding apparatus comprising two parallel slide-holders, rotative slide-carriers located at opposite ends of the holders, reciprocating pressers acting to thrust the slides from the carriers into the holders and through the latter, means for giving intermittent rotative motion to the said slide-carriers, and means for actuating the said pressers adapted to advance the same during the intervals between the turning movements of the slide-carriers.

15. A slide-feeding apparatus comprising two slide-holders, rotative slide-carriers located at opposite ends of the said holders, a rotative shaft on which both of said slide-holders are mounted, and means for giving intermittent rotative movement to said shaft.

16. A slide-feeding apparatus comprising a receiving and a delivery slide-holder, a rotative slide-carrier, and means for giving intermittent rotative movement to the slide-carrier consisting of a motor applied to give rotative movement to said slide-carrier, a plurality of stops on the slide-carrier, a detent adapted to engage said stops to arrest the movement of the slide-carrier, and means for actuating the said detent to release it from said stops.

17. A slide-feeding apparatus comprising a receiving and a delivery slide-holder, a rotative slide-carrier, and means for giving intermittent rotative movement to the slide-carrier consisting of a motor applied to give rotative movement to said slide-carrier, a plurality of stops on the slide-carrier, a detent adapted to engage said stops to arrest the movement of the slide-carrier, and a spring-actuated timing device for moving said detent to release it from the said stop.

18. A slide-feeding apparatus comprising a delivery and a receiving slide-holder, a rotative slide-carrier, spring-actuated means operating to turn the slide-carrier, and a stop mechanism for the slide-carrier comprising a plurality of stops on the carrier, a detent adapted to engage the said stops, a vertically-arranged slide-bar adapted to act by impact upon the said detent, a detent for holding the slide-bar in its elevated position, means actuated by the carrier for lifting the slide-bar into its elevated position, a detent for holding said slide-bar in its elevated position, and means acting on said slide-bar detent to release the same from the slide-bar at desired intervals.

19. A slide-feeding apparatus comprising a delivery and a receiving slide-holder, a rotative slide-carrier, spring-actuated means operating to turn the slide-carrier, and a stop mechanism for the slide-carrier comprising a plurality of stops on the carrier, a detent adapted to engage the said stops, a vertically-arranged slide-bar adapted to act by impact upon the said detent, a detent for holding the slide-bar in its elevated position, means actuated by the rotative carrier for lifting the slide-bar detent in its elevated position, and a spring-actuated timing mechanism acting on said slide-bar-supporting detent to release the slide-bar at desired intervals.

20. The combination with a rotative slide-carrier and means for turning the same, of a stop mechanism comprising a plurality of stops on the slide-carrier, a detent adapted to engage said stops, a vertically-moving slide-bar adapted to act by impact upon said detent, means operated by the rotative carrier for lifting the said slide-bar, a detent which holds the slide-bar in its elevated position, a rotative shaft provided with an arm adapted to engage said detent to release it from the slide-bar and means for giving rotative movement to said shaft.

21. The combination with a rotative slide-carrier and means for turning the same, of a stop mechanism comprising a plurality of stops on the slide-carrier, a detent adapted to engage said stops, a vertically-moving slide-bar adapted to act by impact upon said detent, means operated by the rotative carrier for lifting the said slide-bar, a detent which holds the slide-bar in its elevated position, a rotative shaft provided with an arm adapted to engage said slide-bar detent to release it from the slide-bar, and a timing mechanism embracing an actuating-spring and a train of gears adapted to give rotative movement to said shaft.

22. The combination with a rotative slide-carrier and means for turning the same of a stop mechanism comprising a plurality of stops on the slide-carrier, a detent adapted for engagement with said stops, a vertically-movable slide-bar adapted to act by impact upon said detent, means on the said slide-carrier for lifting the slide-bar, a detent for holding the slide-bar in its elevated position, a rotative shaft and an arm pivoted to said shaft and adapted for engagement with the said slide-bar detent, said arm being weighted and provided with a stop projection adapted to hold the arm in an extended position when at the rising side of the shaft and to permit the arm to fall by gravity when it passes over the axis of the shaft.

23. The combination with a slide-holder, and a rotative slide-carrier, of a reciprocating presser and means for operating said presser comprising a rock-shaft provided with a rigid arm connected with the presser, and also with a rigid actuating-arm, a rotative shaft provided with an eccentric, and a connecting-rod transmitting motion from said eccentric to said actuating-arm on the rock-shaft.

24. The combination with two slide-holders, of slide-carriers located at opposite ends of the holders and adapted to shift the slides from one holder to the other, reciprocating pressers located at the receiving ends of the holders, and means for actuating said holders comprising a rock-shaft provided with arms which are connected with the holders and also with actuating-arms, a rotative shaft provided with two eccentrics, and connecting-rods for transmitting motion from said eccentrics to the actuating-arms of the rock-shafts.

25. A slide-feeding apparatus comprising two slide-holders, rotative slide-carriers at opposite ends of the holders, a shaft on which said carriers are mounted, means applied to give intermittent rotative movement to said shaft, acting to turn the said shaft a part of a rotation at each movement thereof, reciprocating pressers, a presser-actuating shaft connected with the pressers and adapted to advance and retract the same by a complete rotation of said shaft, driving connections between said slide-carrier shaft and presser-actuating shaft, embracing a spring, and means actuated by one of the slide-carriers acting to control the turning movements of the said presser-actuating shaft.

26. A slide-feeding apparatus comprising two slide-holders, rotative slide-carriers located at opposite ends of the holders, a rotative shaft on which both of said slide-carriers are mounted, reciprocating pressers located at the receiving ends of both slide-holders, a rotative presser-actuating shaft, means for giving intermittent partial rotative movements to the slide-carrier shaft and actuating connections between said slide-carrier shaft and the presser-actuating shaft embracing a rotative part on the presser-actuating shaft, a spring connecting said rotative part with the latter shaft and means operated by one of the said rotative slide-carriers acting to control the turning movements of said presser-actuating shaft so as to permit the rotation of the same at the intervals between the turning movements of the said carriers.

27. A slide-feeding apparatus comprising two slide-holders, rotative slide-carriers at opposite ends of the holders, a rotative shaft on which said slide-carriers are mounted, reciprocating pressers located at the receiving ends of the slide-holders, a rotative presser-actuating shaft, means for giving intermittent partial rotative movements to the slide-carrier shaft, a rotative part on the presser-actuating shaft, a spring connecting said rotative part with the latter shaft, a stop-arm on the presser-actuating shaft, a detent adapted to engage said stop-arm, and means operated by one of said rotative slide-carriers acting on said detent to control the turning movements of said presser-actuating shaft.

28. The combination with a rotative slide-carrier shaft and means for giving intermittent rotative movement thereto, of a presser-actuating shaft, a part mounted to turn on said presser-actuating shaft which is driven from the slide-carrier shaft, a spring connecting said presser-actuating shaft with said rotative part thereon, a rigid stop-arm on said presser-actuating shaft, a detent adapted to engage said arm, a lever connected with said detent, and cam-plates on one of the slide-carriers acting on said lever to shift the detent and release the stop-arm.

29. The combination with a rotative slide-carrier and carrier-shaft, of a reciprocating presser, a presser-actuating shaft, driving connections between said slide-carrier shaft and the presser-actuating shaft embracing a part mounted to rotate on the presser-actuating shaft, a spring connecting said rotative part on the presser-actuating shaft with the latter shaft, a stop-arm on said presser-actuating shaft, a detent adapted to engage said stop-arm, means operated by the rotative carriers for actuating the said detent, and a spring-arm adapted to engage said arm when in contact with the said detent to prevent backward turning of said presser-actuating shaft.

30. A slide-feeding apparatus comprising two slide-holders, a rotative slide-carrier, means for giving intermittent rotative movement to said slide-carrier, and means for controlling the speed of rotation of the slide-carrier, embracing a fan, and a train of gears driven by the rotative slide-carrier and operating the fan.

31. The combination with a projecting apparatus, of two slide-holders, and a rotative slide-carrier, the centers of said slide-holders and the optical axis of the projecting apparatus being located at equal distances from the axis of rotation of the slide-carrier, and at equal angular distances from each other, and the slide-carrier having slide-receiving apertures corresponding in location with said slide-holders and optical axis.

32. The combination with two slide-holders, of a rotative slide-carrier, a spring-motor for turning said slide-carrier, a stop mechanism for the slide-carrier comprising a plurality of stops on said carrier, a detent engaging said stops, means for actuating said detent to release it from the stop, and means for controlling the speed of rotation of the carrier comprising a series of gear-teeth on the carrier, a train of gears operated by said gear-teeth, and a fan operated by said train of gears.

33. The combination with a picture-projecting apparatus, of two slide-holders located at one side of the same, a rotative slide-carrier provided with slide-receiving apertures adapted to be carried by the turning of the slide-carrier in the position opposite the two slide-holders, and also into position in line with the optical axis of the projecting apparatus, means for moving the slides through one of said slide-holders into the apertures of the slide-carrier, and means for shifting the said slides from the slide-carrier into the other slide-holder.

34. The combination of a projecting apparatus, a vertically-arranged frame-plate, delivery and receiving slide-holders connected with said plate, said plate being provided with two apertures which coincide with the slide-holders and a third aperture in line with the optical axis of the projecting apparatus, a rotative slide-carrier mounted at the front face of the said plate, said slide-carrier being provided with slide-receiving apertures adapted to coincide with the apertures in the said plate, means for moving the slides from one of said slide-carriers into the slide-receiving apertures of the slide-carrier, and means for thrusting said slides from the apertures of the slide-carriers into the other slide-holder and through the latter.

35. A slide-feeding apparatus comprising a vertically-arranged frame-plate, delivery and receiving slide-holders connected with said plate, said plate being provided with two apertures coinciding with said holders and a third aperture in line with the optical axis of the projecting apparatus, a rotative slide-carrier having the form of a flat disk mounted to turn in contact with the outer face of said plate, said disk being provided with slide-receiving apertures adapted to coincide with the apertures in said plate, stops on the said carrier adapted to overlap the said apertures to hold the slides therein, means for moving the slides through the delivery-holder and into the apertures of said slide-carrier, and means for thrusting the slides from the said slide-carrier into the receiving-holder and through the latter.

36. A slide-feeding apparatus comprising a vertically-arranged frame-plate, slide delivering and receiving holders connected with said plate, said plate being provided with apertures adapted for the passage of the slides from and to said holders, a rotative slide-carrier having the form of a flat disk mounted in contact with the outer face of said plate, and means for thrusting the slides from the apertures of said slide-carrier into the receiving-holder, comprising a stationary supporting-plate attached at its outer margin to the said frame-plate and projecting inwardly over the slide-carrier, a reciprocating presser mounted in said supporting-plate and adapted to act upon the slides to force the same from the slide-carrier into the receiving-holder and means for giving reciprocatory motion to the said presser.

37. The combination with two slide-holders, of a rotative slide-carrier consisting of a disk and arms pivoted to the disk, and stops on the said disk to hold the pivoted arms extended when at the upwardly-moving side of the carrier.

38. The combination with a lantern or projecting apparatus, of two slide-holders located at the side of the said projecting apparatus, a rotative slide-carrier located at the front end of said holders, adapted to receive the slides from one of the holders to carry the same into position for projection, to then carry the same to the other holder, and a rotative slide-carrier at the rear of said slide-holders embracing a rotative disk, and a plurality of arms pivoted to the disk and adapted to stand in an extended position at the rising side of the disk and to hang in a depending position at the descending side of the disk.

39. The combination with a lantern or projecting apparatus of two slide-holders located at one side of the said projecting apparatus, a rotative slide-carrier located at the front end of said holders, adapted to receive the slides from one of the holders, to carry the same into position for projection to then carry the same to the other holder, a rotative slide-carrier at the rear of said slide-holders, embracing a rotative disk, a plurality of arms pivoted to the disk adapted to stand in an extended position at the rising side of the disk and to hang in a depending position at the descending side of the disk, and a curved guide at the rear ends of said slide-holders adapted to engage the outer edges of the said slides when the same are being moved by the said arms.

40. The combination with two slide-holders, of a rotative slide-carrier consisting of a disk and arms pivoted to the disk, stops on the said disk to hold the pivoted arms extended when at the upwardly-moving side of the carrier, and a spring-actuated detent-lever adapted to engage the free ends of said arms to temporarily hold said arms in their upright positions.

41. A slide-feed apparatus comprising two parallel vertically-arranged frame-plates provided with apertures for the passage of the slides and two slide-holders each consisting of rods which extend between and attached at their ends to the said plates, said rods being made telescopic to permit the length of the slide-holders to be adjusted.

42. A slide-feeding apparatus comprising two vertically-arranged parallel frame-plates, slide-holders formed by means of rods which extend between and are connected with the plates, rotative slide-carriers at the outer faces of the plates, and a shaft on which the said slide-carriers are mounted, said rods constituting the slide-carriers being telescopic, and the slide-carrier at the rear of the holders being connected with the said shaft by a spline and groove so that the rear plate may be shifted backwardly and forwardly to vary the length of the slide-holders.

43. The combination with two slide-holders, of rotative slide-carriers, reciprocating pressers, and spring-actuated detents at the receiving ends of the holders, adapted to hold the slides from outward movement after the same have been thrust into the holders by said pressers.

In testimony that we claim the foregoing as our invention we affix our signatures, in presence of two witnesses, this 27th day of July, A. D. 1903.

WILLIAM M. GREEN.
JOHN R. GENT.

Witnesses:
C. CLARENCE POOLE,
GERTRUDE BRYCE.